(12) United States Patent
Harada

(10) Patent No.: US 11,405,515 B2
(45) Date of Patent: Aug. 2, 2022

(54) IMAGE FORMING APPARATUS

(71) Applicant: KYOCERA Document Solutions Inc., Osaka (JP)

(72) Inventor: Hiroyuki Harada, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/379,218

(22) Filed: Jul. 19, 2021

(65) Prior Publication Data
US 2022/0030120 A1   Jan. 27, 2022

(30) Foreign Application Priority Data

Jul. 21, 2020 (JP) .............................. JP2020-124338

(51) Int. Cl.
*H04N 1/00* (2006.01)
*G03G 15/00* (2006.01)
*F21V 8/00* (2006.01)

(52) U.S. Cl.
CPC ....... *H04N 1/0049* (2013.01); *G03G 15/5016* (2013.01); *H04N 1/00397* (2013.01); *G02B 6/0008* (2013.01)

(58) Field of Classification Search
CPC ............. H04N 1/0049; H04N 1/00397; G03G 15/5016; G02B 6/0008
See application file for complete search history.

(56) References Cited

U.S. PATENT DOCUMENTS

| 2004/0028505 | A1* | 2/2004 | Bilbrey | B42C 9/0068 412/8 |
| 2013/0322911 | A1* | 12/2013 | Hamaya | G03G 15/80 399/88 |
| 2015/0332872 | A1* | 11/2015 | Konishi | H01H 13/02 200/341 |
| 2021/0318642 | A1* | 10/2021 | Koguchi | G03G 15/0886 |
| 2021/0345743 | A1* | 11/2021 | Ribeiro Ruiz | A47J 36/2483 |

FOREIGN PATENT DOCUMENTS

| JP | H01-167925 A | 7/1987 |
| JP | H09-069018 A | 3/1997 |

* cited by examiner

*Primary Examiner* — Iriana Cruz
(74) *Attorney, Agent, or Firm* — Studebaker & Brackett PC

(57) ABSTRACT

An image forming apparatus includes an image forming part, a main board, a casing and a user interface part. The image forming part forms an image on the sheet. On the main board, which a control circuit for controlling the image forming part is formed. The image forming part and the main board are stored in the casing. The user interface part includes at least one of operation member which receives an operation and a display member which displays a state of the image forming part, and is mounted on a circuit formed surface of the main board.

5 Claims, 5 Drawing Sheets

IMAGE FORMING APPARATUS

INCORPORATION BY REFERENCE

This application is based on and claims the benefit of priority from Japanese patent application No. 2020-124338 filed on Jul. 21, 2020, which is incorporated by reference in its entirety.

BACKGROUND

The present disclosure relates to an image forming apparatus.

An image forming apparatus is provided with a user interface part such as a switch which receives an operation by a user, a lamp which indicates a state of the apparatus, and the like. The user interface part is conventionally mounted on a dedicated board different from a main board on which a control circuit is formed.

However, when the dedicated board on which the user interface part is mounted is provided, increase in the number of members increases the cost and makes it difficult to make the apparatus small.

SUMMARY

In accordance with an aspect of the present disclosure, an image forming apparatus includes an image forming part, a main board, a casing and a user interface part. The image forming part forms an image on the sheet. On the main board, which a control circuit for controlling the image forming part is formed. The image forming part and the main board are stored in the casing. The user interface part includes at least one of operation member which receives an operation and a display member which displays a state of the image forming part, and is mounted on a circuit formed surface of the main board.

The other features and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, a printer 1 (an example of an image forming apparatus) according to one embodiment of the present disclosure will be described.

Figure 1:
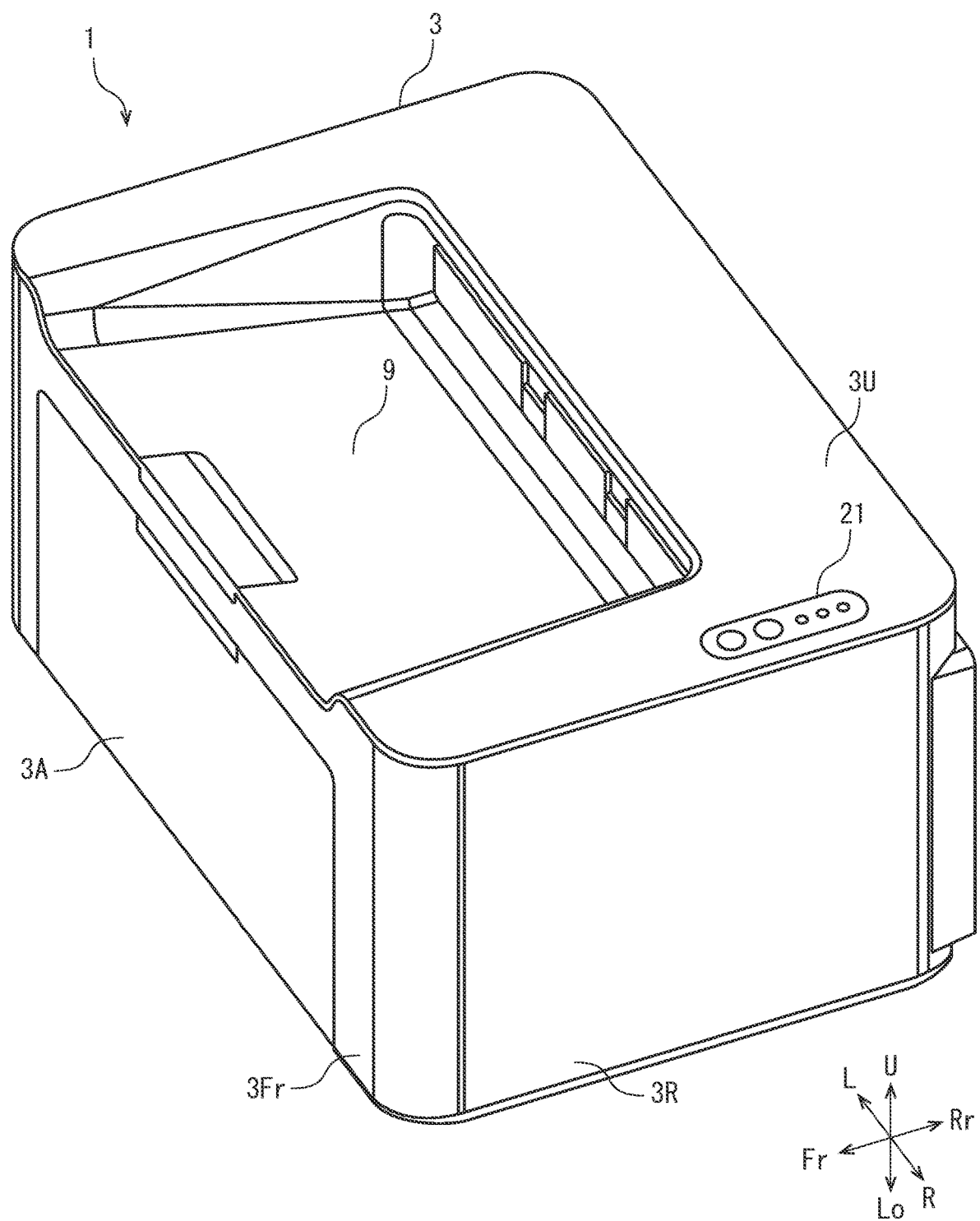
FIG. 1 is a perspective view an exterior appearance of a printer according to one embodiment of the present disclosure.
Figure 2:
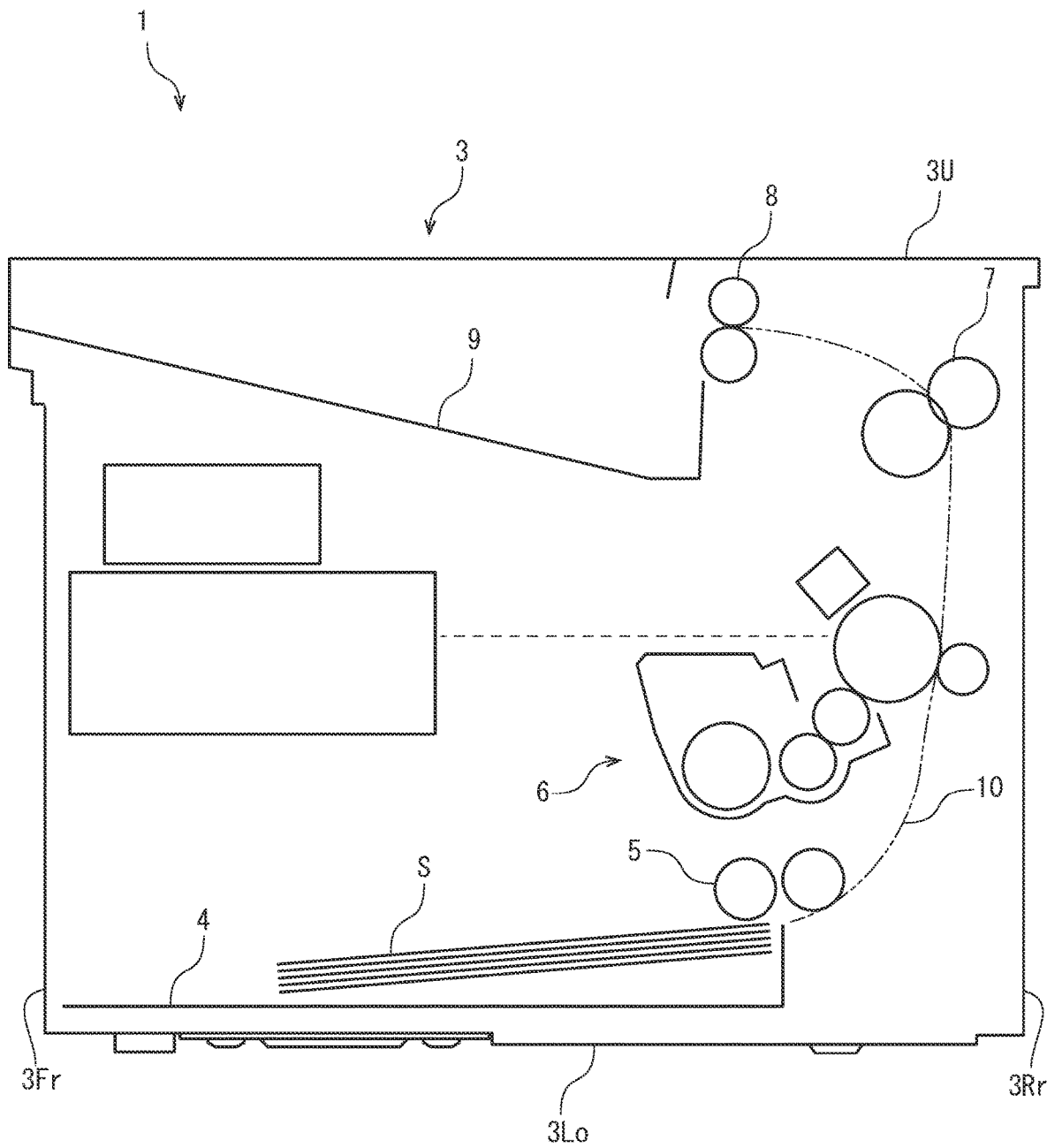
FIG. 2 is a right side view showing an inner structure of the printer according to the embodiment of the present disclosure.
Figure 2:
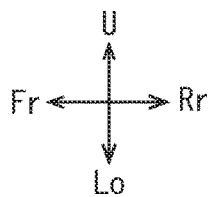

First, an entire structure of the printer 1 will be described. FIG. 1 is a perspective view showing an inner structure of the printer 1. FIG. 1 is a perspective view showing an exterior appearance of the printer 1. In the following description, a Fr side in FIG. 1 and FIG. 2 is defined as a front side of the printer 1, and the left-and-right direction is based on a direction in which the printer 1 is viewed from the front side. U, Lo, L, R, Fr and Rr in each figure indicate an upper, a lower, a left, a right, a front and a rear, respectively.

The printer 1 includes a parallelepiped shape casing 3. The casing 3 has a top plate 3U, a bottom plate 3Lo, a front side plate 3Fr, a rear side plate 3Rr, a right side plate 3R and a left side plate 3L (not shown). In the lower portion of the inside of the casing 3, a sheet feeding tray 4 in which a sheet S is stored and a sheet feeding roller 5 which feeds the sheet S from the sheet feeding tray 4 are provided. In the front side plate 3Fr, a front cover 3A is provided in an openable and closable manner around a hinge provided in the lower portion as a fulcrum, and the sheet S is stored in the sheet feeding tray 4 after the front cover 3A is opened. Above the sheet feeding tray 4, an image forming part 6 which forms an image on the sheet S in an electrophotographic type image forming manner and a fixing device 7 which fixes the image on the sheet S are provided. In the upper portion of the casing 3, a discharge rollers pair 8 which discharges the sheet S on which the image is fixed and a discharge tray 9 on which the discharged sheet S is stacked are provided. The image forming part 6 includes a photosensitive drum, a charger, an exposure device, a development device and a transferring roller. The development device is connected to a toner container which supplies a toner to the development device.

In the casing 3, a conveyance path 10 from the sheet feeding roller 5 to the discharge rollers pair 8 through the image forming part 6 and fixing device 7 is provided. On the conveyance path 10, a plurality of conveyance rollers pairs which convey the sheet s is provided.

Each part of the printer 1 is controlled by a control board 2. The control board 2 may be achieved by a processor cooperated with software, or a hardware including an integral circuit not cooperated with software. The processer reads control program stored in a memory and executes it to perform the various processing. As the processer, a CPU (a Central Processing Unit) is used, for example. The memory includes a storage medium such as a ROM (a Read Only Memory), a RAM (a Random Access Memory), an EEPROM (an Electrically Erasable Programmable Read Only Memory) or the like.

When an image forming job is input to the printer 1 from an external computer, the sheet feeding roller 5 feeds the sheet S from the sheet feeding tray 4 to the conveyance path 10. In the image forming part 6, the charger charges the photosensitive drum at a predetermined potential, the exposure device forms an electrostatic latent image on the photosensitive drum, the development device develops the electrostatic latent image into a toner image by using the toner supplied from the toner container, and the transferring roller transfers the toner image to the sheet S. Then, the fixing device 7 heats the toner image and fixes the toner image on the sheet S, and the discharge rollers pair 8 discharges the sheet S on the discharge tray 9.

Figure 3:
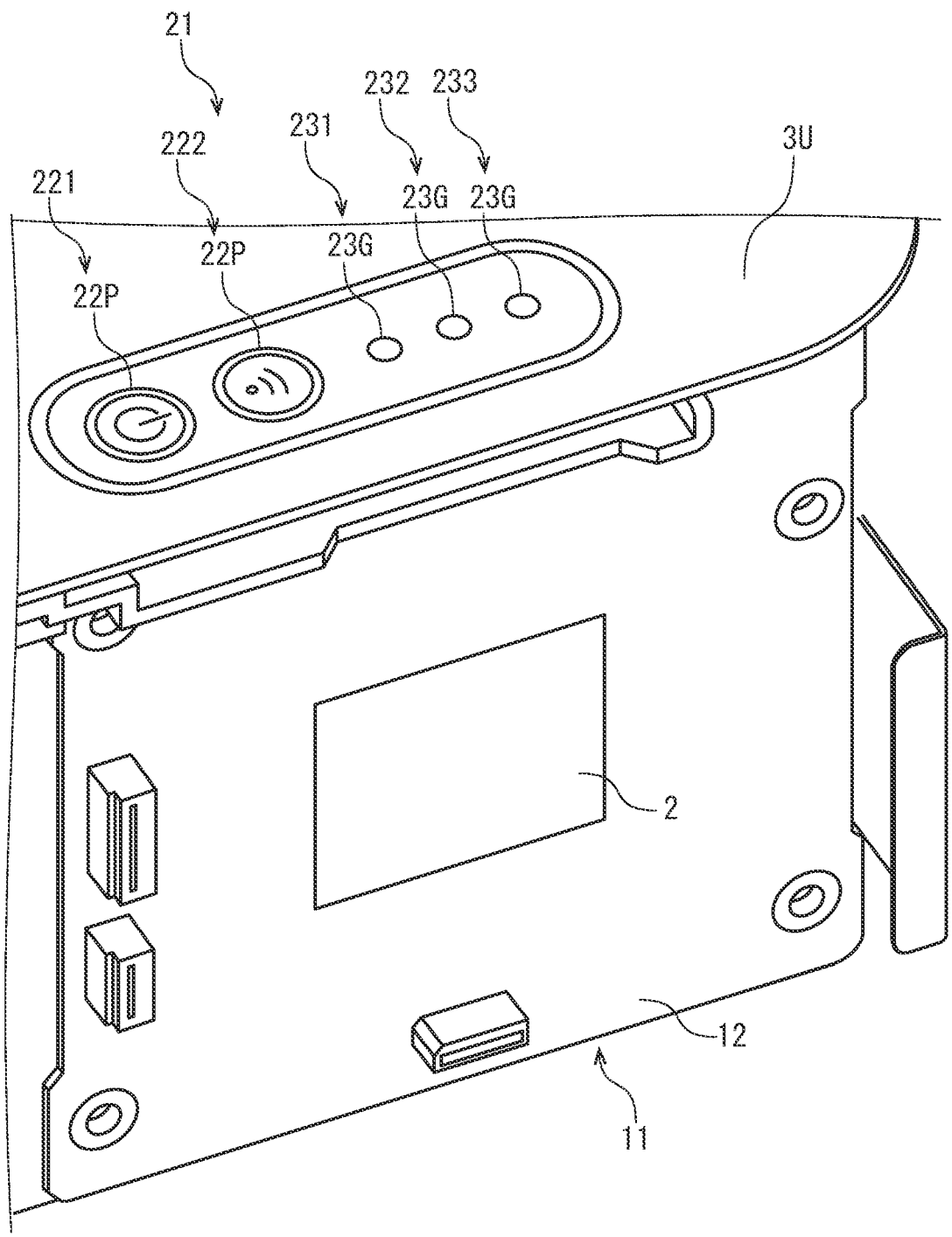
FIG. 3 is a perspective view showing a main board and a user interface part according to the embodiment of the present disclosure.
Figure 3:
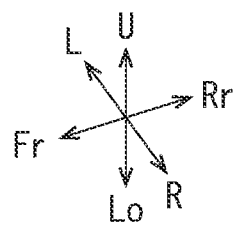
Figure 4:
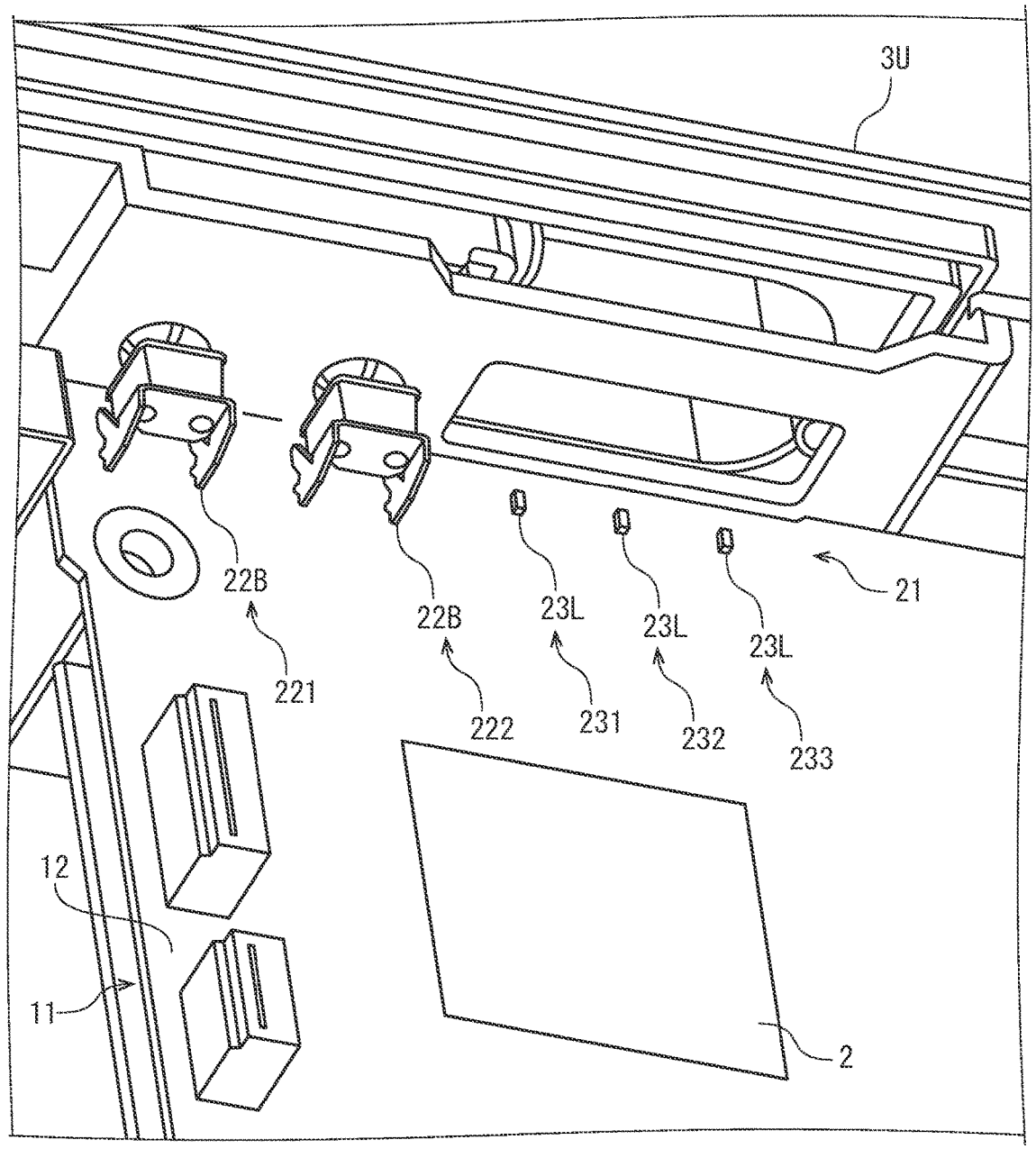
FIG. 4 is a perspective view showing the main board according to the embodiment of the present disclosure.
Figure 4:
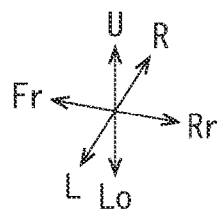
Figure 5A:
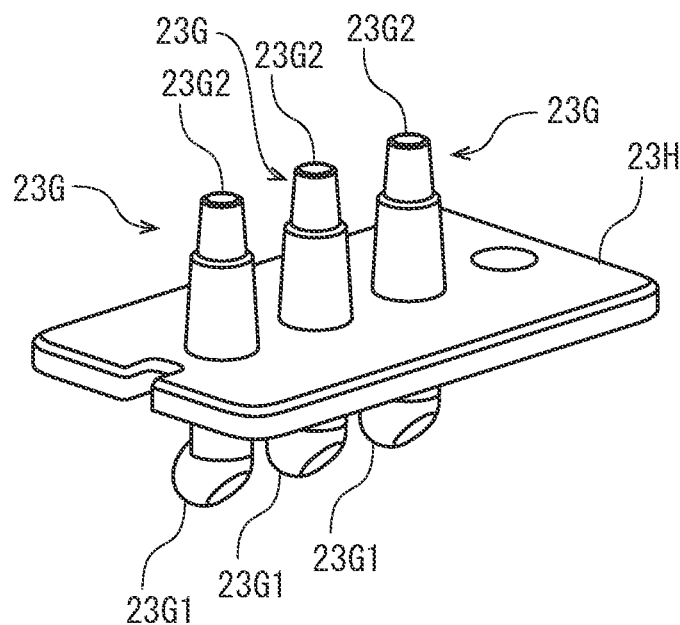
FIG. 5A is a perspective view showing a light guide lens according to the embodiment of the present disclosure.
Figure 5A:
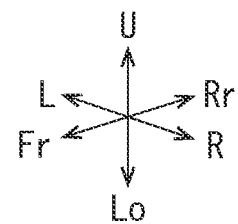
Figure 5B:
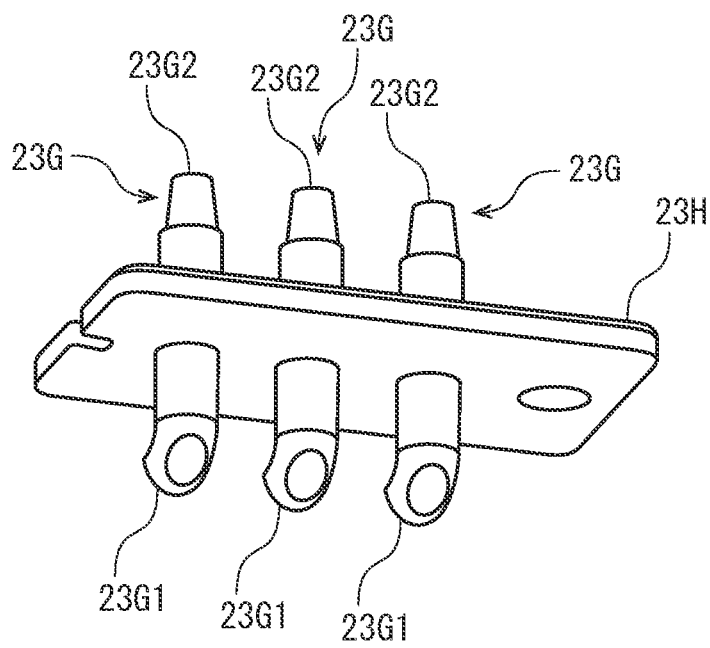
FIG. 5B is a perspective view showing the light guide lens according to the embodiment of the present disclosure.
Figure 5B:
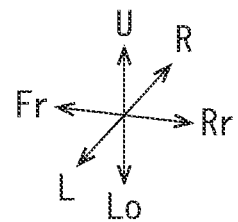

Next, a user interface part 21 will be described. FIG. 3 is a perspective view showing a main board 11 and the user interface part 21. FIG. 4 is a perspective view showing the main board 11. FIG. 5A and FIG. 5B are a perspective views showing the light guide lens 23G. The printer 1 includes the image forming part 6 which forms an image on the sheet S, the main board 11 on which a control circuit 2 for controlling the image forming part 6 is formed, the casing 3 in which the image forming part 6 and the main board 11 are stored, and the user interface part 21. The user interface part 21 includes at least one of operation members 221 and 222 which revives an operation and display members 231 to 233 which displays a state of the apparatus, and is mounted on a circuit formed surface 12 of the main board 11. Hereinafter, the operation members 221 and 222 are called the operation member 22 collectively, and the display members 231 and 233 are called the display member 23 collectively.

On the circuit formed surface 12 of the main board 11, the control circuit 2 containing the processer, the memory and the others are formed. The control circuit 2 is connected to the image forming part 6, and controls the image forming part 6. To the control circuit 2, a power supply board and a wireless local area network (LAN) interface are connected (not shown). The control circuit 2 controls a power supply from the power supply circuit to the image forming part 6. The control circuit 2 performs a communication with an external device via the wireless LAN interface. The main board 11 is provided such that the circuit formed surface 12 faces the right side plate 3R of the casing 3.

The operation member 22 is a tactile switch, for example, and includes a base portion 22B having a plurality of terminals, a plurality of conductors facing the terminals, and a plunger 22P pushed by a user to contact the conductor with the terminal. The operation member 222 is provided between the control circuit 2 and the power supply circuit, and is used for power-on operation and power-off operation. The operation member 222 is provided between the control circuit 2 and the wireless LAN interface, and is used for connection and disconnection with the wireless LAN interface. The base portion 22B is mounted on the circuit formed surface 12 of the main board 11. The plunger 22P is exposed to the upper face of the top plate 3U of the casing 3. Thus, the user can push the plunger 22P easily.

The display member 23 includes a LED 23L (a Light Emitting Diode, an example of a light emitting element) and a light guide lens 23G, for example. The control circuit 2 turns on the display member 231 when the image forming job can be received. The control circuit 2 turns on the display member 232 when the wireless LAN is connected. The control circuit 2 turns on the display member 233 when an error occurs in the printer 1. The LED 23L is mounted on the circuit formed surface 12 of the main board 11. The light guide lens 23G is an L-shaped rod-like member made by polycarbonate, for example, and is mounted to a plate-shaped holder 23H. The holder 23H is fixed below the top plate 3U of the casing 3. One end of the light guide lens 23G is an incident portion 23G1 on which the light of the LED 23L is incident, and the other end of the light guide lens 23G is an emission portion 23G2 from which the light is emitted. The incident portion 23G1 faces the LED 23L, and the emission portion 23G2 is exposed to the upper surface of the top plate 3U of the casing 3. Thus, the user can view the emission portion 23G easily.

According to the printer 1 of the present embodiment described above, the user interface part 21 is mounted on the circuit formed surface 12 of the main board 11, so that the dedicated board for the user interface part 21 can be omitted. Therefore, according to the printer 1 of the present embodiment, the unexpensive and small image forming apparatus can be provided.

According to the printer 1 of the present embodiment, the circuit formed surface 12 of the main board 11 is provided so as to face the right side face 3R of the casing 3, so that the main board 11 is disposed using a space in the casing 3 efficiently while avoiding interfacing with the sheet feeding tray 4, the discharge tray 9 and the front cover 3A.

The above embodiment may be modified as follows.

The above embodiment shows an example in which the user interface part 21 includes the operation member 22 and the display member 23, but the user interface part 21 may include the operation member 22 only, or the display member 23 only.

The above embodiment shown an example in which the plunger 22P and the light guide lens 23G are exposed to the upper surface of the top plate 3U, but the plunger 22P and the light guide lens 23G may be exposed to the outer surface of the light side plate 3R of the casing 3. In this case, it may be configured that the light emitted from the LED 23L can be viewed from the outside of the casing 3 directly without providing the light guide lens 23G.

The above embodiment shows an example in which the main board 11 is provided such that the circuit formed surface 12 faces the right side plate 3R of the housing 3, but the main board 11 may be provided such that the circuit forming surface 12 faces the rear side plate 3Rr of the housing 3. In this case, the operation member 22 and the display member 23 are provided side by side along the rear edge of the top plate 3U of the housing 3.

Further, the main board 11 may be provided such that the circuit formed surface 12 faces the top plate 3U of the housing 3. In this case, without providing the light guide lens 23G, the light emitted from the LED 23L may be directly visible from the outside of the housing 3.

The above embodiment shows an example in which the display member 23 includes the LED 23L and the light guide lens 23G, but a liquid crystal display panel may be provided as the display member 23, and the control circuit 2 may display a character string or the like indicating the state of the apparatus on the liquid crystal display panel.

The present disclosure may be changed, substituted, or modified in various ways without departing from the spirit of the technical idea, and the claims include all embodiments which may be included within the scope of the technical idea.

The invention claimed is:

1. An image forming apparatus comprising:
    an image forming part which forms an image on the sheet;
    a main board on which a control circuit for controlling the image forming part is formed;
    a casing in which the image forming part and the main board are stored; and
    a user interface part including at least one of operation member which receives an operation and a display member which displays a state of the image forming part, and mounted on a circuit formed surface of the main board, wherein
    the circuit formed surface is provided so as to face a side plate of the casing,
    the operation member is a tactile switch having a base portion with a terminal, and a plunger,
    the base portion is disposed along an upper edge of the circuit formed surface, and
    the plunger is disposed along a side edge of a top plate of the casing.

2. The image forming apparatus according to claim 1, wherein
    the display member contains a light emitting element, and the light emitting element is mounted on the circuit formed surface.

3. The image forming apparatus according to claim 2, wherein
the display member contains a light guide lens, and
one end of the light guide lens is exposed to a top surface or a side surface of the casing.

4. An image forming apparatus comprising:
an image forming part which forms an image on the sheet;
a main board on which a control circuit for controlling the image forming part is formed;
a casing in which the image forming part and the main board are stored; and
a user interface part including at least one of an operation member which receives an operation and a display member which displays a state of the image forming part, and mounted on a circuit formed surface of the main board, wherein
the circuit formed surface is provided so as to face a side plate of the casing,
the display member includes a light emitting element and a light guide lens,
the light emitting element is disposed along an upper edge of the circuit formed surface, and
one end of the light guide lens is disposed along a side edge of an upper surface of the casing.

5. The image forming apparatus according to claim 4, wherein
the operation member is a tactile switch having a base portion with a terminal, and a plunger, and
the base portion is mounted on the circuit formed surface and the plunger is exposed to the upper surface of the casing or a side surface of the casing.

* * * * *